(12) United States Patent
Jensen et al.

(10) Patent No.: US 9,371,942 B2
(45) Date of Patent: Jun. 21, 2016

(54) TUBING FOR A LIQUID MEDIUM THAT IS TO BE CONDITIONED

(71) Applicant: TI Automotive (Heidelberg) GmbH, Heidelberg (DE)

(72) Inventors: Hans Jensen, Dettingen unter Teck (DE); Walter Hersel, Leonberg (DE)

(73) Assignee: TI Automotive (Heidelberg) GmbH, Heidelberg (DE)

( * ) Notice: Subject to any disclaimer, the term of this patent is extended or adjusted under 35 U.S.C. 154(b) by 0 days.

(21) Appl. No.: 13/865,652

(22) Filed: Apr. 18, 2013

(65) Prior Publication Data

US 2013/0276436 A1    Oct. 24, 2013

(30) Foreign Application Priority Data

Apr. 20, 2012  (EP) .................................. 12 164 962

(51) Int. Cl.
| | |
|---|---|
| F15D 1/02 | (2006.01) |
| F16L 9/19 | (2006.01) |
| B32B 1/08 | (2006.01) |
| F16L 53/00 | (2006.01) |
| B32B 27/34 | (2006.01) |
| F01N 3/20 | (2006.01) |

(52) U.S. Cl.
CPC ... *F16L 9/19* (2013.01); *B32B 1/08* (2013.01); *B32B 27/34* (2013.01); *F01N 3/208* (2013.01); *F16L 53/002* (2013.01); *B32B 2597/00* (2013.01); *F01N 3/2066* (2013.01); *F01N 2240/02* (2013.01); *F01N 2530/18* (2013.01); *F01N 2610/02* (2013.01); *F01N 2610/10* (2013.01); *F01N 2610/14* (2013.01); *F01N 2610/1486* (2013.01)

(58) Field of Classification Search
USPC .......................................... 138/38, 114, 115
See application file for complete search history.

(56) References Cited

U.S. PATENT DOCUMENTS 3,859,040 A * 1/1975 Shefsiek ................. F23L 15/04
                                                                       138/38
3,938,233 A * 2/1976 Cannon ................... B23P 15/26
                                                                       138/111

(Continued)

FOREIGN PATENT DOCUMENTS

| DE | 102007000526 A1 | 4/2008 |
|---|---|---|
| DE | 202008014425 U1 | 4/2010 |

(Continued)

OTHER PUBLICATIONS

European Patent Office, Search Report in European Patent Application No. 12 164 962.8 (Oct. 8, 2012).

*Primary Examiner* — James Hook
(74) *Attorney, Agent, or Firm* — Brinks Gilson & Lione

(57) ABSTRACT

Tubing for a liquid medium that is to be conditioned, including an inner tube for the liquid-medium that is to be conditioned encompassed by an outer tube, parallel to the inner tube. An outermost tube surrounds the outer tube. At least one duct for the liquid conditioning medium, is disposed between the inner tube and the outer tube and at least one duct for the liquid conditioning medium is disposed between the outer tube and the outermost tube. A redirecting region connects the ducts between the inner tube and outer tube and the outer tube and the outermost tube. The inner tube and the outer tube consist of thermoplastic plastics, and the unit, consisting of the inner tube and the outer tube, is produced by co-extrusion.

14 Claims, 2 Drawing Sheets

(56) References Cited

U.S. PATENT DOCUMENTS

Figure 1:
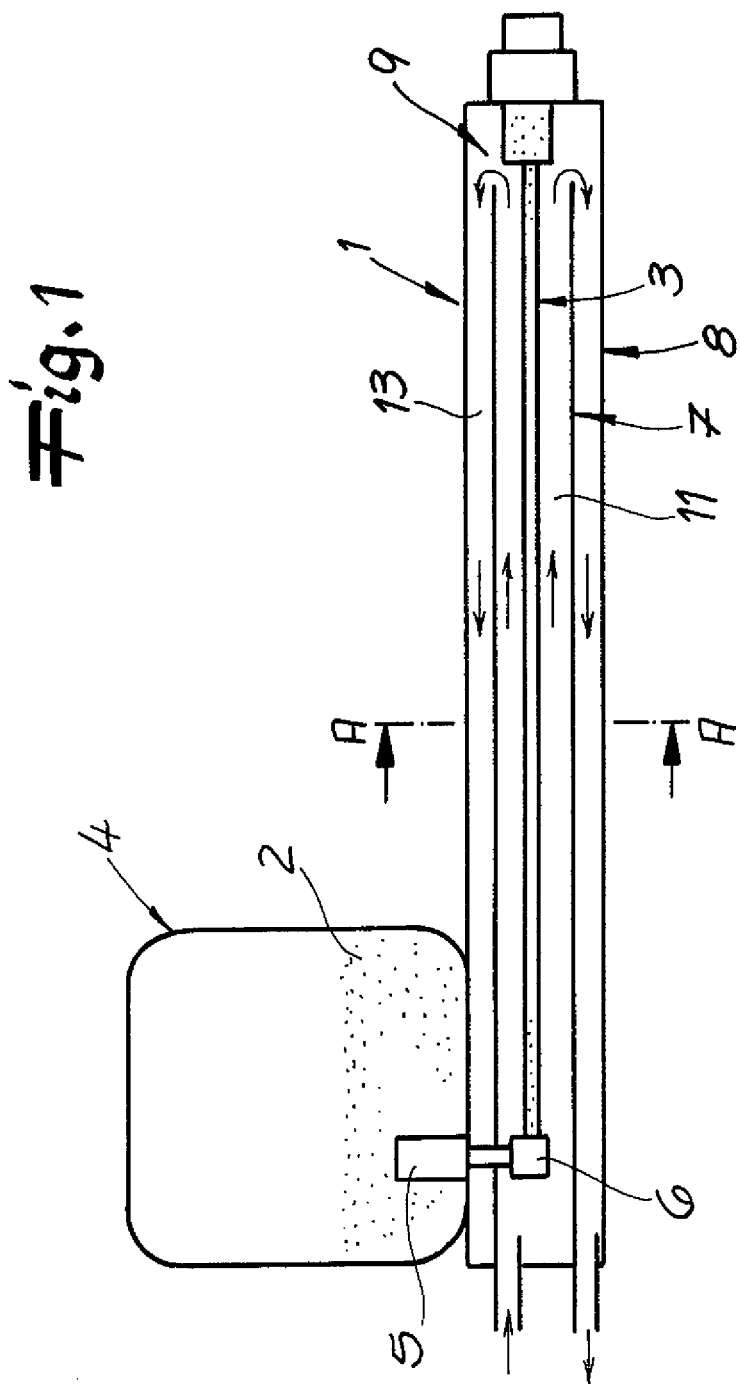

| | | | |
|---|---|---|---|
| 3,976,129 A * | 8/1976 | Silver | 165/154 |
| 4,157,194 A * | 6/1979 | Takahashi | 285/3 |
| 4,729,409 A * | 3/1988 | Paul | 138/115 |
| 4,906,496 A * | 3/1990 | Hosono et al. | 428/36.9 |
| 5,076,242 A * | 12/1991 | Parker | F02M 55/007 123/468 |
| 5,163,433 A * | 11/1992 | Kagawa et al. | 601/2 |
| 5,421,998 A * | 6/1995 | Li et al. | 210/136 |
| 5,611,373 A * | 3/1997 | Ashcraft | 138/113 |
| 5,884,475 A | 3/1999 | Hofmann et al. | |
| 5,915,465 A * | 6/1999 | Fix et al. | 165/103 |
| 5,988,521 A * | 11/1999 | Nohynek | B05B 1/202 118/24 |
| 6,139,810 A * | 10/2000 | Gottzmann | B01J 8/009 422/201 |
| 6,564,831 B1 * | 5/2003 | Sanoner et al. | 138/115 |
| 7,302,936 B2 * | 12/2007 | Stolarz et al. | 123/468 |
| 8,295,692 B2 * | 10/2012 | McClanahan | F28F 9/22 138/37 |
| 8,356,577 B2 * | 1/2013 | Van Den Berg | 119/14.54 |
| 8,671,992 B2 * | 3/2014 | Feechan et al. | 138/115 |
| 2003/0105172 A1 * | 6/2003 | Bowe et al. | 518/728 |
| 2005/0056332 A1 * | 3/2005 | Martucci et al. | 138/115 |
| 2005/0113893 A1 * | 5/2005 | Saab | 607/105 |
| 2008/0092531 A1 | 4/2008 | Suzuki et al. | |
| 2008/0245519 A1 * | 10/2008 | Ustun | 165/181 |
| 2011/0214847 A1 * | 9/2011 | Hur et al. | 165/143 |
| 2011/0302910 A1 * | 12/2011 | Burgers et al. | 60/299 |
| 2012/0148925 A1 * | 6/2012 | Grannell et al. | 429/408 |
| 2013/0071508 A1 * | 3/2013 | Nakai et al. | 425/405.2 |

FOREIGN PATENT DOCUMENTS

| | | |
|---|---|---|
| EP | 1698769 A2 | 9/2006 |
| FR | 2900063 A1 | 10/2007 |
| WO | WO 2008/005829 A2 | 1/2008 |

* cited by examiner

TUBING FOR A LIQUID MEDIUM THAT IS TO BE CONDITIONED

CROSS-REFERENCE TO RELATED APPLICATIONS

This patent application claims priority pursuant to Title 35 USC Section 119(e) to European Patent Application No. 12 164 962.8 filed Apr. 20, 2012, the entire contents of which are hereby incorporated by reference herein.

The invention concerns a tubing for a liquid medium that is to be conditioned, in particular for a carbamide solution. The term "liquid medium" preferably refers to a fluid medium. The tubing according to the invention serves, in particular, for the heating of the liquid, or fluid medium, respectively, and is particularly preferred for the heating of a carbamide solution.

In motor vehicles, in particular in vehicles having a diesel motor, a so-called SCR system having an SCR catalytic converter for the treatment of exhaust gas is normally present (SCR: Selective Catalytic Reduction). For an effective reduction of the nitrogen oxides contained in the exhaust of a motor vehicle, a carbamide solution is added to the exhaust prior to an SCR catalytic converter. A carbamide solution, or an aqueous carbamide solution, respectively, of this type, has the disadvantage that carbamide freezes at temperatures below $-11°$ C., and partially crystallizes. As a result, further, functionally safe, conveyance of the carbamide solution is hampered, or fully blocked, and an effective reduction of the nitrogen oxides in the exhaust gas is impaired or hampered. In order to prevent disruptions of this type, the supply lines, or tubing, respectively, for the carbamide solution, are heated. A heating of this type, executed in the form of electric heating, and the placing of one or more heating elements on the tubing, or in the tubing for this purpose, is already known. Fundamentally, a heating carried out by means of heated liquid mediums is also already known. The majority of known measures have the disadvantage that they can only be implemented in a complicated or costly manner, and/or a sufficiently effective conditioning, or heating, respectively, of the fluid medium that is to be conditioned is not ensured.

With respect to this, the invention addresses the technical problem of providing a tubing of the type specified in the introduction, which can be implemented with little effort and in particular, in a less costly manner, and with which, nonetheless, a very effective conditioning of the liquid medium, or the carbamide solution, respectively, is made possible.

In order to solve this technical problem, the invention teaches of a tubing for a liquid medium, in particular for a carbamide solution, or aqueous carbamide solution, respectively, that is to be conditioned, wherein an inner tube is provided for the liquid medium that is to be conditioned, or for a liquid conditioning medium, wherein the inner tube is encompassed by an outer tube, and runs parallel, or substantially parallel, respectively, to the outer tube, wherein at least one duct, for the liquid conditioning medium, or for the liquid medium that is to be conditioned, is disposed between the inner tube and the outer tube, and wherein the inner tube and the outer tube consist of thermoplastic plastics, or, respectively, substantially consist of thermoplastic plastics, and wherein the unit, consisting of the inner tube and the outer tube, is produced by means of co-extrusion.

As explained above, the liquid medium that is to be conditioned preferably concerns a fluid medium that is to be conditioned, this being, in particular, a liquid medium that is to be heated. The scope of the invention, with respect to the liquid medium that is to be conditioned, concerns a carbamide solution, or an aqueous carbamide solution, respectively. For this purpose, the tubing for the carbamide solution that is to be conditioned, or heated, respectively, is a component of an SCR system in a motor vehicle. The liquid conditioning medium serves to temper, or heat, respectively, the liquid medium that is to be conditioned. The scope of the invention, with respect to the liquid conditioning medium, concerns a heated, fluid conditioning medium.

Furthermore, the scope of the invention concerns, with respect to the tubing, a tubing obtained by means of co-extrusion. This means that the inner tube and the outer tube, and if applicable, other components, which shall be explained below, are extruded collectively, or are co-extruded, respectively. For this purpose, the co-extruded tubing consists of thermoplastic plastics, or substantially consists of thermoplastic plastics. It is also possible to use a plastic which is suitable for extrusion, or co-extrusion, respectively.

One recommended embodiment of the invention is distinguished in that the liquid medium that is to be conditioned is received in the inner tube, or, respectively, flows therein, and that the liquid conditioning medium is received, or flows, respectively, in the, at least one, duct between the inner tube and the outer tube.

A very preferred embodiment of the invention is characterized in that the inner wall of the outer tube is connected by means of numerous co-extruded bridges to the outer wall of the inner tube, and in that the co-extruded bridges extend in the longitudinal direction of the tubing. Co-extruded bridges mean, in particular, that the bridges can be extruded, or co-extruded, respectively, together with the inner tube and the outer tube. The scope of the invention provides that the co-extruded bridges also consist of thermoplastic plastics, or, respectively, consist of the thermoplastic plastics used for the rest of the tubing. Furthermore, the scope of the invention also provides that the bridges are formed as a unit on the inner wall of the outer tube and on the outer wall of the inner tube. It is recommended that the bridges run over the course of the length of the tubing, and this being without interruption, or, respectively, without gaps, over the course of the length of the tubing. By means of the bridges, the space between the inner tube and the outer tube is preferably subdivided into numerous ducts for the liquid conditioning medium or for the liquid medium that is to be conditioned. For this purpose, the bridges are disposed such that they are distributed uniformly over the circumference of the inner tube, or, respectively, over the circumference of the outer tube. The scope of the invention provides that the bridges run parallel to one another in the longitudinal direction of the tubing. Preferably, the cross-sections of the ducts, limited by the inner tube, the outer tube and the bridges, are of the same size, or substantially the same size, respectively. It is advantageous for all of the ducts to exhibit the same cross-section shape, or substantially the same cross-section shape, respectively. For this purpose, the inner wall of the outer tube is connected to the outer wall of the inner tube by means of at least two bridges, preferably at least three bridges, and particularly preferred is that it is connected by means of at least four bridges.

A very recommended embodiment of the tubing according to the invention is characterized in that a co-extruded outermost tube is provided, that the unit, comprising the inner tube and outer tube, is disposed in the outermost tube, or, respectively, is encompassed by the outermost tube, that the outermost tube runs in the longitudinal direction of the unit and parallel, or substantially parallel, to the unit, and that at least one outer duct for the liquid conditioning medium is disposed between the outer tube and the outermost tube. A co-extruded outermost tube means, in particular, that the outermost tube is extruded, or co-extruded, respectively, together with the outer tube, and the inner tube, and if applicable, with the bridges. The scope of the invention provides that the co-extruded outermost tube consists of a thermoplastic plastic, or consists, or substantially consists, respectively, of the thermoplastic plastics used for the rest of the tubing.

One preferred embodiment of the invention is characterized in that the liquid medium that is to be conditioned is received, or flows, respectively, in the inner tube, that the liquid conditioning medium is received, or flows, respectively, in the at least one duct between the inner tube and the outer tube, and that likewise, the liquid conditioning medium is received, or flows, respectively, in the outer duct between the outer tube and the outermost tube.

One embodiment of the invention is distinguished in that the liquid conditioning medium is received, or flows, respectively, in the inner tube, that the liquid medium that is to be conditioned is received, or flows, respectively in the at least one duct between the inner tube and the outer tube, and that the liquid conditioning medium is received, or flows, respectively, in the at least one outer duct between the outer tube and the outermost tube.

It is recommended that the inner wall of the outermost tube is connected by means of numerous co-extruded outer bridges to the outer wall of the outer tube, and that the co-extruded outer bridges extend in the longitudinal direction of the tubing. Co-extruded outer bridges means, in particular, that the outer bridges are extruded, or co-extruded, respectively, together with the inner tube, the outer tube, and with the outermost tube, and, if applicable, with the bridges. The scope of the invention provides that the outer bridges are formed as a unit on the inner wall of the outermost tube, and on the outer wall of the outer tube. Furthermore, the scope of the invention provides that the outer bridges consist of thermoplastic plastics, or, respectively, of the thermoplastic plastics used for the rest of the tubing. For this purpose, the outer bridges run over the length of the tubing, or, respectively, without interruption, over the length of the tubing. The outer bridges subdivide the space between the outer tube and the outermost tube into numerous outer ducts for the liquid conditioning medium. It is recommended that the outer bridges be disposed such that they are distributed uniformly over the circumference of the outermost tube, or over the circumference of the outer tube, respectively. Advantageously, the outer ducts, separated by the outer bridges, have a cross-section of the same size, and preferably the same cross-section shape. For this purpose, the inner wall of the outermost tube is connected by means of at least two outer bridges, preferably at least three outer bridges, and it is particularly preferred that it is connected by means of at least four bridges, to the outer wall of the outer tube.

According to a preferred further development of the invention, the bridges, and/or the outer bridges, exhibit a trapezoidal cross-section. For this, it is recommended that the trapezoids taper toward the center of the tubing. In an advantageous design of the invention it is provided that the bridges be disposed such that they are offset, in relation to the outer bridges, on the circumference of the outer tube. For this purpose, a bridge is disposed such that it is in the middle, or basically in the middle, between two outer bridges, with respect to the circumference of the outer tube.

According to a recommended embodiment of the invention, the wall thickness of the inner tube and/or the wall thickness of the outer tube, and/or the wall thickness of the outermost tube is 0.6-3 min, preferably 0.8-2.5 mm, more preferably 0.9-2.2 mm, and particularly preferably, 1-2 mm. It is provided in the scope of the invention that the inner tube and/or the outer tube and/or the outermost tube are cylindrical in shape, or are substantially cylindrical in shape, respectively. It is furthermore provided in the scope of the invention that the inner tube is disposed concentrically within the outer tube, and/or that the outer tube, or, respectively, the unit, consisting of the inner tube and the outer tube, is disposed concentrically within the outermost tube. A coaxial configuration of the inner tube and outer tube and/or of the outer tube and the outermost tube has proven to be successful within the scope of the invention.

According to a recommended embodiment of the invention, the ratio of the inner diameter d of the inner tube to the radial width $r_i$ of a duct between the inner tube and the outer tube, and/or the ratio of the inner diameter d of the inner tube to the radial width $r_a$ of an outer duct between the outer tube and the outermost tube is 3-15, preferably 4-14, and more preferably 4-12. It has been shown to be advantageous that the inner diameter d of the inner tube is 2-15 mm, preferably 3-13 mm, and more preferably 4-12 mm. It is recommended that the radial width $r_i$ of a duct and/or the radial width $r_a$ of an outer duct is 0.5-3.0 mm, preferably 0.6-2.0 mm, and more preferably, 0.8-1.5 mm, and particularly preferably, 0.8-1.2 mm.

It is provided in the scope of the invention that the tubing according to the invention is a component of a motor vehicle, and that the conditioning medium is preferably heated cooling fluid, or, respectively, heated cooling water, and/or is fuel, or recirculated fuel, respectively. According to one embodiment, diverted, heated cooling water from the cooling water circulation system of the motor vehicle is used as the conditioning medium. According to another embodiment variation, fuel recirculated from the motor of the motor vehicle to the fuel tank is used as the conditioning medium.

A preferred embodiment of the invention is distinguished in that the conditioning medium first flows through the at least one duct between the inner tube and the outer tube in a first direction along the tubing, that a redirecting region for diverting the conditioning medium into the at least one outer duct between the outer tube and the outermost tube is provided, and that the conditioning medium flows along the tubing through the at least one outer duct in a second direction, opposite the first direction. For this purpose, the conditioning medium is thus guided between the inner tube and the outer tube, on one hand, and between the outer tube and the outermost tube, on the other hand, at the same time, in opposite directions. For this, the conditioning medium preferably flows through numerous ducts, separated by bridges, as well as through numerous outer ducts, separated by outer bridges.

It is recommended that the tubing consists, or, respectively, substantially consists of thermoplastic plastics. According to a preferred embodiment variation, the tubing consists of a polyamide, or, respectively, substantially consist of a polyamide. The polyamide can, in particular, be polyamide 12. One embodiment of the invention is distinguished in that the thermo-conductivity of the material of the inner tube is greater than the thermo-conductivity of the material of the outer tube, and/or is greater than the thermo-conductivity of the material of the outermost tube. Fundamentally, the inner tube and/or outer tube and/or outermost tube can consist of the same thermoplastic plastic, and the thermo-conductivity can be adjusted by means of the additives added to the plastic.

It is provided in the scope of the invention that the unit, consisting of the inner tube, outer tube and outermost tube, is encompassed by at least one additional outermost tube, and the inner tube, outer tube, outermost tube and the at least one additional outermost tube are disposed concentrically to one another, or coaxially, respectively, to one another. It is furthermore provided in the scope of the invention that the additional outermost tube is also connected, by means of additional bridges, to the outermost tube. For this purpose, the at least one additional outermost tube is also a co-extruded additional outermost tube, which is extruded, or co-extruded, respectively, together with the rest of the components of the tubing. It is recommended that the liquid conditioning medium also flows through the intermediate space, or the channels, respectively, between the outermost tube and the additional outermost tube, and this being preferably in a direction opposite to the direction of flow with which the conditioning medium flows through the outer ducts between the outer tube and the outermost tube. According to one embodiment of the invention, the tubing can be encompassed by a protective shell—for example in the form of a flute tube. This protective shell serves, in particular, as a safeguard against mechanical effects.

The invention is based on the finding that, with the tubing according to the invention, a surprisingly effective conditioning of a liquid medium, in particular a carbamide solution, is possible. A carbamide solution conveyed through the tubing according to the invention can be simply and effectively protected against freezing or crystallization. Furthermore, it should be emphasized that the tubing according to the invention can be implemented with relative simple and uncomplicated means. It is therefore possible to eliminate a complex electrical heating with heating elements or suchlike in an advantageous manner. The tubing according to the invention can be realized, or produced, respectively, in a relatively cost effective manner. Furthermore, the tubing according to the invention is also distinguished by its optimal stability and mechanical resistance to wear.

Figure 2:
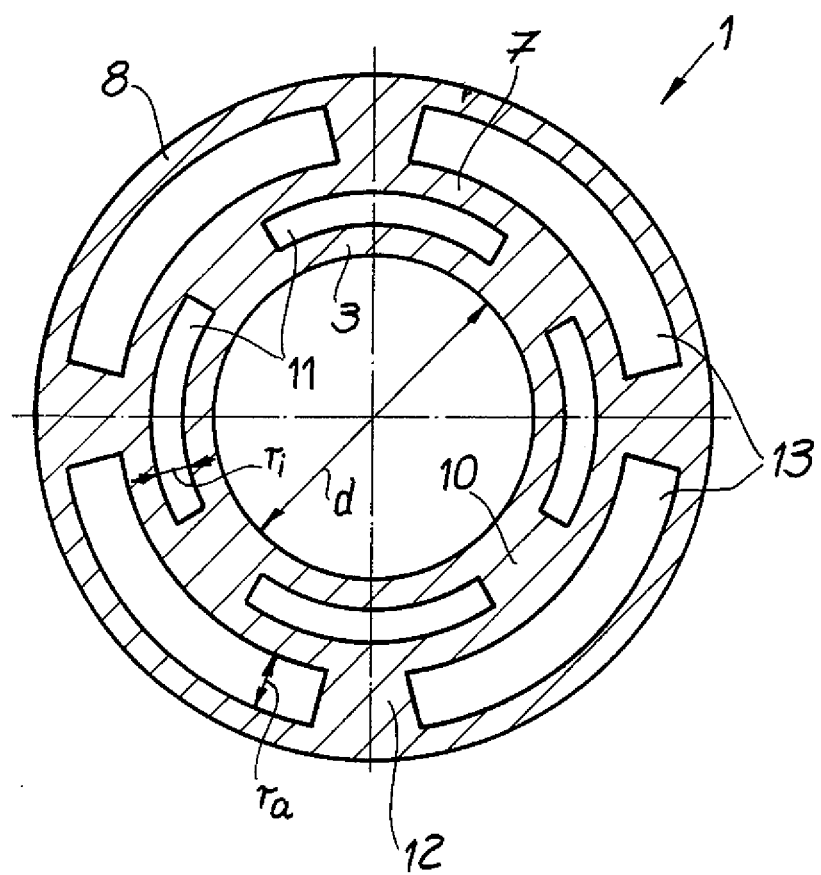

In the following, the invention shall be explained in greater detail based on drawings depicting only one embodiment example. They show, in a schematic depiction:

FIG. 1 a side view of a tubing according to the invention, in a sectional depiction, and FIG. 2 a section A-A cut through the subject matter of FIG. 1.

The figures show a tubing 1 according to the invention for a carbamide solution that is to be conditioned, or heated, respectively. The tubing 1 according to FIG. 1 exhibits an inner tube 3, for conveying the carbamide solution 2 to a, not shown, SCR catalytic converter. In the embodiment example, the carbamide solution 2 is received in a tank 4 and fed to the inner tube 3 by means of a pump 5, via the valve 6. The inner tube 3 is encompassed by an outer tube 7, such that the inner tube 3 and the outer tube 7 are disposed concentrically, or coaxially, to one another. The outer tube 7, or the unit consisting of the inner tube 3 and the outer tube 7, is encompassed by an outermost tube 8, such that the inner tube 3, the outer tube 7, and the outermost tube 8 are disposed concentrically, or coaxially, to one another.

In FIG. 1, the flow, or the direction of flow, respectively, of a liquid conditioning medium for the heating of the carbamide solution, is indicated by arrows. The tubing 1 depicted in the figures is preferably a component of a motor vehicle, and the conditioning medium, according to one embodiment, is heated cooling fluid diverted from the cooling circulation system of the motor vehicle. The conditioning medium first flows from left to right in FIG. 1, through the intermediate space between the inner tube 3 and the outer tube 7 until it reaches a redirecting region 9. At this point, the intermediate space between the inner tube 3 and the outer tube 7 is in a liquid connection to the intermediate space between the outer tube 7 and the outermost tube 8. The conditioning medium is redirected in the redirecting region 9 into the intermediate space between the outer tube 7 and the outermost tube 8, and now flows in the opposite direction, from right to left in FIG. 1.

In this manner, a very effective conditioning of the carbamide solution is obtained in the inner tube 3.

The tubing 1 furthermore, preferably consists of a co-extruded tubing consisting of thermoplastic plastics, wherein the inner tube 3, outer tube 7, and outermost tube 8 are extruded collectively, or co-extruded, respectively. FIG. 2 shows a section, cut through the tubing according to FIG. 1. It can be seen that the inner wall of the outer tube 7 is connected by means of four bridges 10 to the outer wall of the inner tube 3 in the embodiment example. The bridges 10 extend, preferably without interruption, in the longitudinal direction of the tubing 1. In this manner, the intermediate space between the inner tube 3 and the outer tube 7 is subdivided, in the embodiment example, into four ducts 11 for the conditioning medium. It can furthermore be seen in FIG. 2 that the inner wall of the outermost tube 8 is connected by means of four outer bridges 12 to the outer wall of the outer tube 7 in the embodiment example. For this purpose, the outer bridges 12 extend without interruption over the length of the tubing 1 in the longitudinal direction of the tubing. Thus, the intermediate space between the outer tube 7 and the outermost tube 8 is subdivided into four outer ducts 13. Preferably, and in the embodiment example, the bridges 10 and the outer bridges 12 are disposed parallel to one another. It is provided in the scope of the invention that the bridges 10 and the outer bridges 12 are extruded, or co-extruded, respectively, together with the inner tube 3, the outer tube 7 and the outermost tube 8. For this purpose, and in the embodiment example, the bridges 10 and the outer bridges 12 exhibit a trapezoidal cross-section. In this case, the trapezoids preferably taper toward the center of the tubing.

It can be seen in FIG. 2 that, according to a preferred embodiment, and in the embodiment example, both the inner tube 3 and the outer tube 7 as well as the outermost tube 8, are designed to be cylindrical, having a circular cross-section. The inner tube 3 is disposed concentrically within the outer tube 7, and the unit, consisting of the inner tube 3 and the outer tube 7, is disposed concentrically within the outermost tube 8. The inner diameter d of the inner tube 3 is preferably 3-8 mm. The radial width $r_i$ of a duct 11, for this purpose, is 0.8-1.2 mm. Preferably, the radial width $r_a$ of an outer duct 13 is also 0.8-1.2 mm. It is recommended that the wall thickness of the inner tube 3 and the wall thickness of the outer tube 7, as well as the wall thickness of the outermost tube 8, are 1-2 mm.

For this purpose, the unit depicted in FIG. 2 is made of a thermoplastic plastic, and said unit is produced by means of co-extrusion. The thermoplastic plastic can consist of polyamide 12. Furthermore, it should be noted that according to a preferred embodiment, and in the embodiment example according to FIG. 2, the bridges 10 are offset on the circumference of the outer tube with respect to the outer bridges 12. For this, preferably, and in the embodiment example, a bridge 10 is disposed in the central region of the adjacent outer ducts 13, and an outer bridge 12 is disposed in the central region of the adjacent ducts 11.

According to an alternative embodiment of the invention, the liquid medium that is to be conditioned, or the carbamide solution, respectively, can also flow through the ducts 11 between the inner tube 3 and the outer tube 7. In this case, the conditioning liquid flows, for this purpose, on one hand, through the inner tube 3, and on the other hand, through the outer ducts 13 between the outer tube 7 and the outermost tube 8.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The claims are to be construed to include alternative embodiments to the extent permitted by the prior art.

The invention claimed is:

1. An apparatus for a motor vehicle for a liquid medium that is to be conditioned, the apparatus comprising:
   a tank for providing the liquid medium that is to be conditioned, and
   a tubing in fluid communication with the tank for advancing the liquid medium that is to be conditioned, wherein the tubing comprises:
   an inner tube for the liquid medium that is to be conditioned or for a liquid conditioning medium, and
   an outer tube, wherein the inner tube is encompassed by the outer tube, and runs substantially parallel, to the outer tube, wherein at least one duct is disposed between the inner tube and the outer tube for the liquid conditioning medium or for the liquid medium that is to be conditioned, wherein the inner tube and the outer tube consist, or substantially consist, of thermoplastic plastics, and wherein a unit, consisting of the inner tube and the outer tube is produced by means of co-extrusion,
   wherein the tubing further comprises at least one co-extruded outermost tube, wherein the unit, consisting of the inner tube and the outer tube, is disposed in the outermost tube, wherein the outermost tube runs in the longitudinal direction of the unit, and parallel or substantially parallel to the unit, and wherein at least one outer duct is disposed between the outer tube and the outermost tube,
   and wherein a redirecting region is provided for redirecting the conditioning medium, and
   wherein the redirecting region is disposed at a first end of the tubing and wherein an inlet and an outlet for the conditioning medium are disposed at a second end of the tubing, wherein the tank is connected with the second end of the tubing, and wherein the first end of the tubing is connected with an SCR catalytic converter.

2. The apparatus according to claim 1, wherein the inner wall of the outer tube is connected by means of numerous co-extruded bridges to the outer wall of the inner tube, and wherein the co-extruded bridges extend in the longitudinal direction of the tubing.

3. The apparatus according to claim 1, wherein the inner wall of the outermost tube is connected to the outer wall of the outer tube by means of numerous co-extruded outer bridges, and wherein the co-extruded outer bridges extend in the longitudinal direction of the tubing.

4. The apparatus according to claim 1, wherein the bridges and/or the outer bridges exhibit a trapezoidal cross-section.

5. The apparatus according to claim 1, where the wall thickness of the inner tube and/or the outer tube and/or the outermost tube is 0.6-3 mm.

6. The apparatus according to claim 1, wherein the inner tube and/or the outer tube and/or the outermost tube are cylindrical, or substantially cylindrical.

7. The apparatus according to claim 1, wherein the inner tube is disposed concentrically within the outer tube, and/or wherein the outer tube, or the unit, consisting of the inner tube and the outer tube, respectively, is disposed concentrically within the outermost tube.

8. The apparatus according to claim 1, wherein the ratio of the inner diameter d of the inner tube to the radial width $r_i$ of a duct between the inner tube and the outer tube, and/or the radial width $r_a$ of an outer duct between the outer tube and the outermost tube is 3-15.

9. The apparatus according to claim 1, wherein the inner diameter d of the inner tube is 2-15 mm.

10. The apparatus according to claim 1, wherein the radial width $r_i$ of a duct and/or the radial width $r_a$ of an outer duct is 0.5-3.0 mm.

11. The apparatus according to claim 1, wherein the tubing is a component of a motor vehicle, and wherein the conditioning medium is preferably heated cooling fluid or recirculated fuel.

12. The apparatus according to claim 1, wherein the medium to be conditioned is a carbamide solution.

13. The apparatus according to claim 1, wherein the liquid medium to be conditioned is received, or flows, respectively, in the inner tube, and wherein the liquid conditioning medium is received, or flows, respectively, at the at least one duct between the inner tube and the outer tube.

14. The apparatus according to claim 1, wherein the conditioning medium first flows through the at least one duct between the inner tube and the outer tube in a first direction, along the tubing, wherein the redirecting region is provided for redirecting the conditioning medium into the at least one outer duct between the outer tube and the outermost tube, and wherein the conditioning medium flows through the at least one outer duct in a second direction, opposite the first direction, along the tubing.

* * * * *